United States Patent [19]

Ausnit

[11] Patent Number: 4,876,842
[45] Date of Patent: Oct. 31, 1989

[54] METHOD OF AND APPARATUS FOR PACKAGING PRODUCT MASSES IN A FORM, FILL AND SEAL MACHINE

[75] Inventor: Steven Ausnit, New York City, N.Y.

[73] Assignee: Minigrip, Inc., Orangeburg, N.Y.

[21] Appl. No.: 144,094

[22] Filed: Jan. 15, 1988

[51] Int. Cl.[4] .................. B65B 9/08; B65B 57/04; B65B 61/18

[52] U.S. Cl. ............................. 53/410; 53/51; 53/64; 53/128; 53/450; 53/550

[58] Field of Search ............... 53/51, 64, 128, 410, 53/412, 450, 451, 551, 552, 550; 493/210, 214

[56] References Cited

U.S. PATENT DOCUMENTS

| | | | |
|---|---|---|---|
| 4,128,985 | 12/1978 | Simmons | 53/64 X |
| 4,316,566 | 2/1982 | Arleth et al. | 53/51 X |
| 4,355,494 | 10/1982 | Tilman | 53/416 |
| 4,381,637 | 5/1983 | Ballestrazzi et al. | 53/51 |
| 4,415,386 | 11/1983 | Ferrell et al. | 53/51 X |
| 4,589,145 | 5/1986 | VanErden et al. | 383/5 |
| 4,601,694 | 7/1986 | Ausnit | 493/214 X |
| 4,617,683 | 10/1986 | Christoff | 53/451 X |
| 4,691,373 | 9/1987 | Ausnit | 383/63 |
| 4,709,533 | 12/1987 | Ausnit | 53/552 X |
| 4,727,709 | 3/1988 | Zieke et al. | 53/551 |
| 4,745,731 | 5/1988 | Talbott et al. | 53/551 |

Primary Examiner—Robert L. Spruill
Assistant Examiner—Beth Bianca
Attorney, Agent, or Firm—Hill, Van Santen, Steadman & Simpson

[57] ABSTRACT

A method of and apparatus for packaging product masses in a form, fill and seal machine, wherein a continuous length of packaging film is joined in running relation by a continuous length of separately formed plastic reclosable fastener assembly having interlock profile strips spot sealed together at package length intervals. The corunning fastener strip assembly and the packaging film are oriented so that the spot seals of the strip are located in alignment with the spaces between the product masses on the film to assure that the fastener strip assembly will be cross sealed at the spot seals when the film is cross sealed between the product masses to provide individual packages. The orienting may be effected by an indexing arrangement including sensor response to index marks on the film and the fastener assembly.

20 Claims, 3 Drawing Sheets

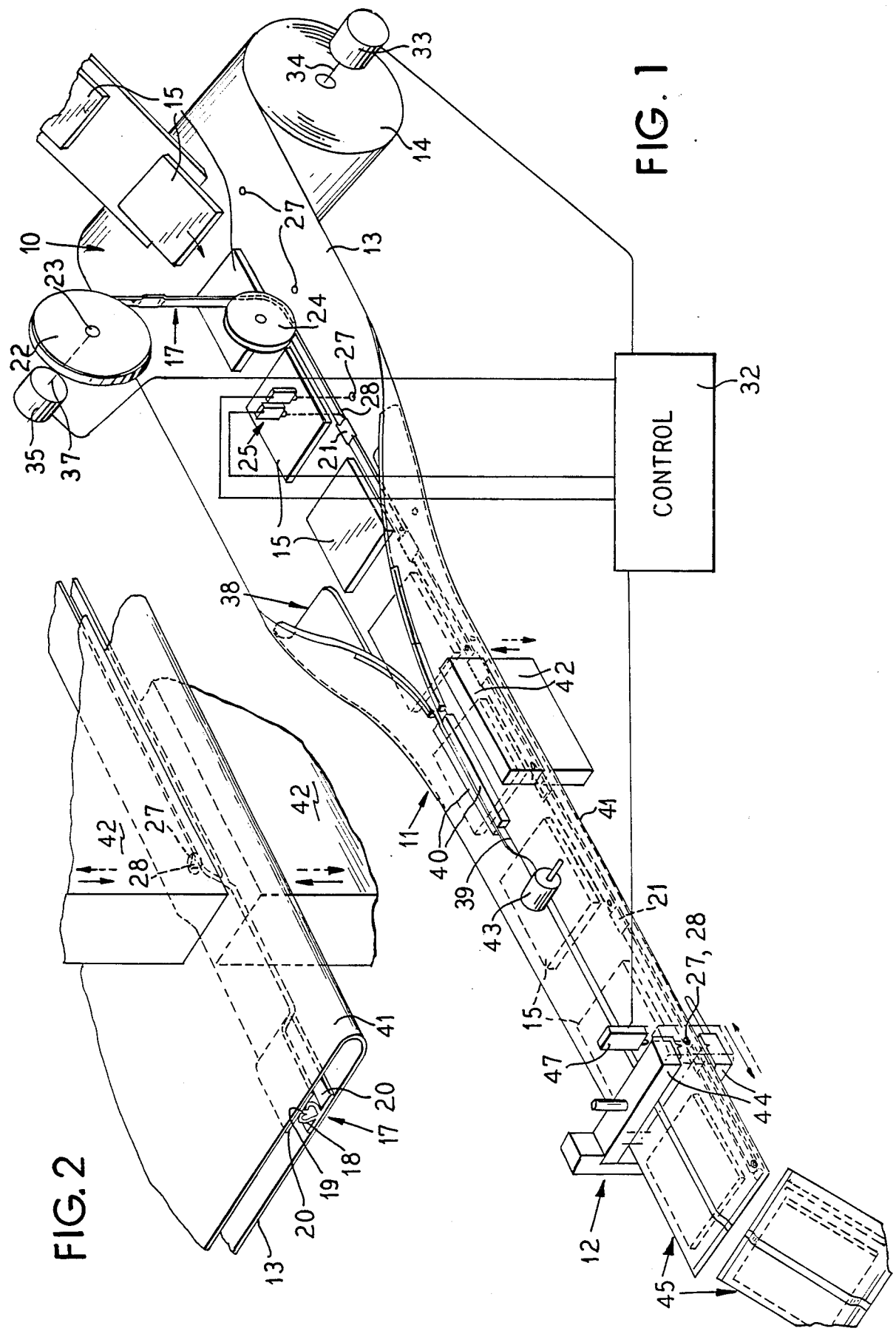

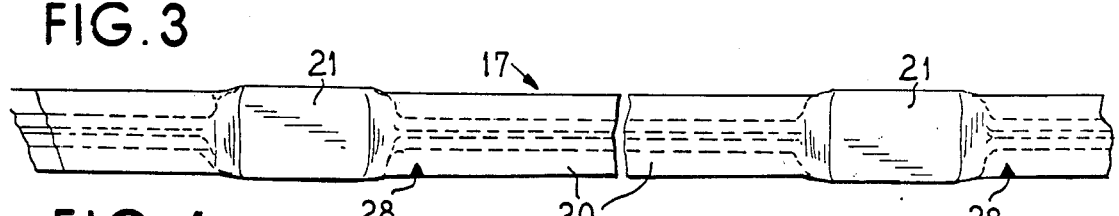
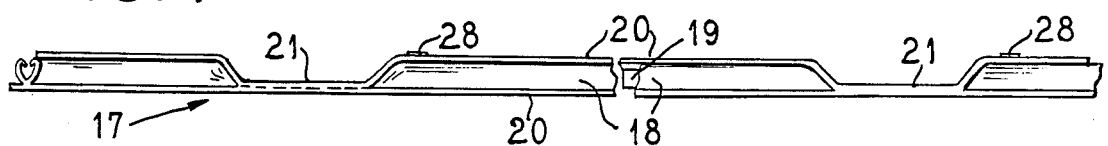
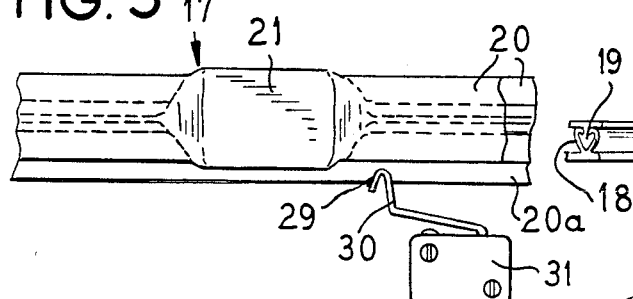
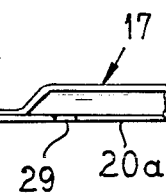
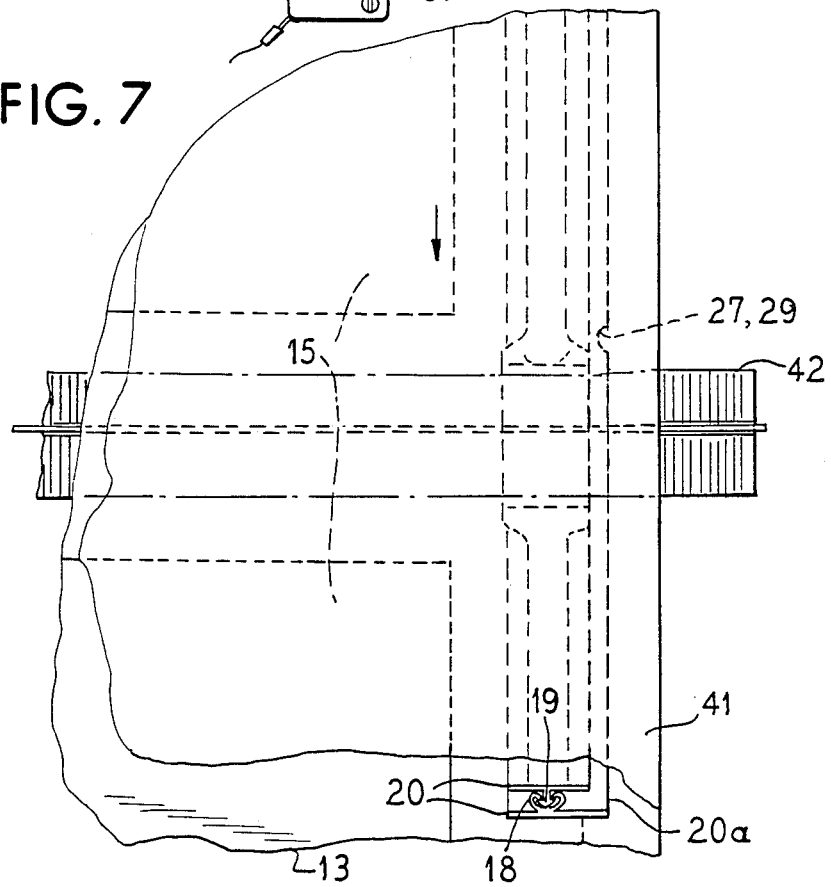

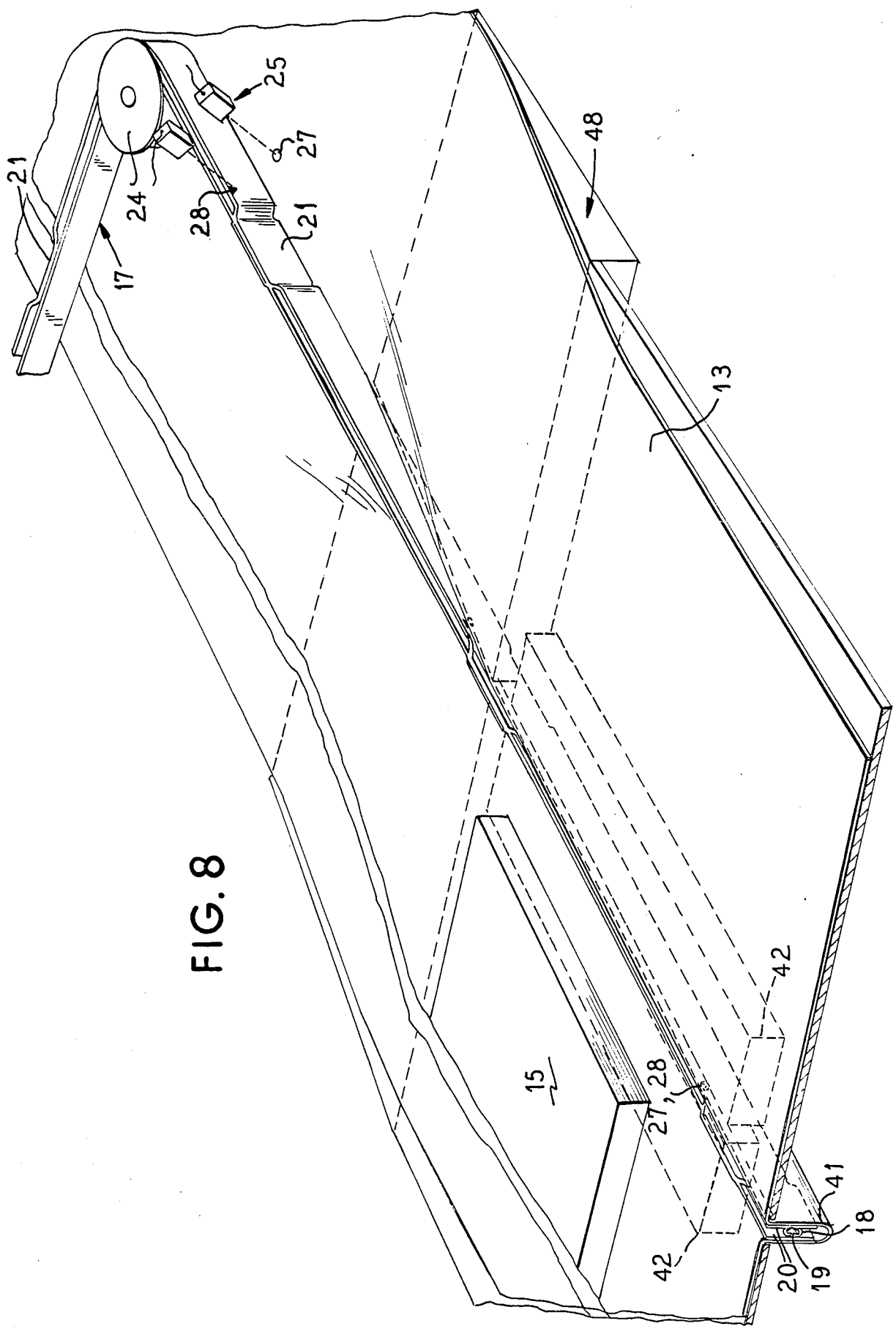

METHOD OF AND APPARATUS FOR PACKAGING PRODUCT MASSES IN A FORM, FILL AND SEAL MACHINE

BACKGROUND OF THE INVENTION

The present invention relates to a method of and apparatus for packaging product masses in a form, fill and seal machine, and more particularly concerns a disclosure such as in U.S. Pat. No. 4,589,145 wherein product masses are deposited on a running continuous length of packaging film, the product masses are wrapped in the film and the film wrap is sealed between the product masses into individual packages. The film carries, as supplied to the machine, reclosable fastener means which is incorporated in a fold at one side of each package so that when the fold is ruptured for access to the product mass within the package, the package can be reclosed by means of the reclosable fastener.

There are some disadvantages in utilizing film and separable fastener prejoined before supplying same to the packager. The packager is compelled to procure the fastener equipped film from a common source, or to have film and fastener procured from different sources and joined together at one of the sources, or to effect such joining as a separate inhouse operation before using the fastener equipped film in the form, fill and seal machine.

SUMMARY OF THE PRESENT INVENTION

An important object of the present invention is to provide a new and improved method of an apparatus for packaging product masses in a form, fill and seal machine, and wherein packaging film and separable fastener means are supplied to and joined in, or as an incident to feeding the film and fastener means to the machine.

Another object of the invention is to provide a new and improved method of and apparatus for packaging in a form, fill and seal machine which receives simultaneously from separate supply sources, packaging film and plastic reclosable fastener assembly which are joined as part of the packaging procedure.

According to the present invention, there is provided a method of packaging product masses in a form, fill and seal machine, comprising running a continuous length of packaging film in the following order through a succession of work stations in the machine, including a loading station wherein product masses are successively placed into engagement with the film at substantially uniformly spaced intervals, a product mass enclosing and film sealing station wherein the film is wrapped and sealed into a tube about the product, and a cross sealing and package separation station wherein the film tube is cross sealed in the spaces between the successive product masses to seal the product masses within individual packages; adjacent to the loading station joining in corunning relation with the packaging film, a continuous length of separately formed plastic reclosable fastener assembly having interlocked profile strips spot sealed together at package length intervals; effecting the joining near one side of the product masses, and orienting the corunning fastener strip assembly and the packaging film so that the spot seals of the strip are located in alignment with the spaces between the product masses on the film; adjacent to said enclosing and sealing station securing the fastener assembly permanently within a fold of said film so that a package length section of the fastener strip assembly will be present in each individual product package; and at the cross sealing station cross sealing the fastener strip assembly spot seals with the cross sealing of the film tube.

The present invention also provides apparatus for practicing the method.

BRIEF DESCRIPTION OF THE DRAWINGS

Other objects, features and advantages of the invention will be readily apparent from the following description of representative embodiments thereof, taken in conjunction with the accompanying drawings, although variations and modifications may be effected without departing from the spirit and scope of the novel concepts embodied in the disclosure, and in which:

FIG. 1 is a more or less schematic illustration of a form, fill and seal packaging machine embodying features of the invention;

FIG. 2 is an enlarged fragmentary perspective view showing in greater detail how a reclosable fastener strip is secured within a fold of the packaging film;

FIG. 3 is an enlarged fragmental plan view of the reclosable fastener assembly shown in FIGS. 1 and 2;

FIG. 4 is a side elevational view of the fastener assembly shown in FIG. 3;

FIG. 5 is a fragmentary plan view of a fastener assembly similar to FIG. 3, but showing a modified indexing arrangement, FIG. 6 is a side elevational view of the fastener assembly shown in FIG. 5;

FIG. 7 is a fragmentary plan view showing the indexing arrangement of FIGS. 5 and 6 as it appears at the cross sealing station of the maching; and FIG. 8 is a schematic elevational view showing a modified arrangement for incorporating the spot sealed fastener assembly in a fold of the packaging film.

DETAILED DESCRIPTION

Referring to FIG. 1, a form, fill and seal machine, of the kind to which the present invention particularly applies, includes a product mass loading station 10, a product mass enclosing and film sealing station 11 and a cross sealing and package separation station 12. For any features of the machine not specifically described herein, or omitted, having regard to the machine as described in U.S. Pat. No. 4,589,145, that patent is referred to, and to any extent necessary incorporated herein by reference.

A continuous length of packaging film 13, which may comprise polyethylene, derived from a supply such as a roll 14 is run successively through the work stations starting at the loading station 10. In the loading station 10, where the film 13 is spread out substantially flat, product masses 15 are successively deposited on the film at substantially uniformly spaced intervals.

Adjacent to the loading station 10 there is joined in corunning relation with the packaging film 13, a continuous length of plastic reclosable fastener assembly 17 having interlocked profile strips 18 and 19 (FIG. 2) herein depicted as of the well known complementary groove and rib type formed from extruded plastic material such as polyethylene. Each of the profile strips has a base 20 which is adapted to be secured as by heat sealing to the film 13. At package length intervals, the interlocked profile strips 18 and 19 are spot sealed together as shown at 21.

Conveniently the supply length of the fastener assembly 17 may be substantially the same as the supply length of the packaging film 13. A reel 22 desirably supports a coil of the continuous length of fastener assembly 17. In a preferred arrangement, the reel 22 may be supported on means such as a spindle 23 at a desirable height above the running path of the film 13. From the reel 22, the continuous length of fastener assembly 17 is fed into corunning relation with the packaging film 13 about a guide pulley 24 near one side of the product masses 15. The corunning fastener assembly 17 and film 13 are oriented lengthwise so that the spot seals 21 are located in alignment with the spaces between the product masses on the film.

Inasmuch as the length of film 13 and the fastener assembly length 17 are fed from independent supply rolls or coils, there may be, at least during running start-up of the machine, and possibly from time to time subsequently, a tendency toward at least slight relative longitudinal displacement or shifting of the length of the film and fastener length and which may cause misalignment of the spot seals 21 relative to the spaces between the product masses 15. To avoid such misalignment, an indexing arrangement is desirably provided for assuring the proper orientation. In one manner of accomplishing the orientation-assuring result, an automatic sensor and adjusting system is employed. In one preferred form of such a system, electric eye or similar sensors 25 are located to observe index spot means 27 provided on the film 13 at proper longitudinally spaced intervals. The sensors 25 determine whether the film index spot means 27 correlate in predetermined alignment with index spot means on the fastener assembly 17 and which may comprise the spot seals 21 or independently provided index spots 28 on the upper profile strip 19, and more particularly, on the base 20 of such strip (FIGS. 1, 3 and 4). The index spots 28 are desirably located adjacent to the upstream side of each of the spot seals 21.

In another version of the sensor system, as depicted in FIGS. 5, 6 and 7, the base 20 of the lower profile strip 18 may be extended laterally to provide a flange 20a on the side of the strip opposite to the side which faces toward the product masses 15. In substantially the same upstream relation to the spot seals 21 as the index spots 28, the flange extension 20a is provided with respective index spot means in the form of notches 29 adapted for receiving a sensor finger 30 of a microswitch sensor 31. If the profile strip base is wide enough, no extension range is needed. In this sensor system, the switch 31 is adapted to replace the electric eye sensor means 25 of FIG. 1. Conveniently, the sensor switch 31 may be located between the supply reel 22 and the guide pulley 24. Alternately, the sensor can be adapted to function relative to the cutout, i.e., the sensor will react to a gap in the strip passing under it.

The sensors 25 and 31 are connected to a master control 32 (FIG. 1). The control 32 is connected to a variable speed motor or magnetic brake 33 corotative through a shaft 34 with the axle of the film supply roll 14. Similarly, the control 32 is connected with a variable speed motor or brake device 35 corotative with the axle of the fastener strip assembly reel 22 through a shaft 37. Through this arrangement the control 32 synchronizes the film 13 and the fastener strip assembly 17 to attain substantially accurate alignment of the spot seals 21 with the center line of the spaces between the product masses 15 on the film 13.

As the film 13 with the corunning fastener strip assembly 17 advances downstream from the loading station 10, into the product mass enclosing and film sealing station 11, the film 13 is turned upon itself into a product mass enclosing tube by a guiding device 38 which brings the side edges of the film together into a fin 39 over the row of product masses 15. The fin 39 is sealed by means such as heat sealing bars 40.

As the film 13 is turned upon itself, a fold 41 is formed enclosing the fastener strip assembly 17. In convenient coordination with the fin sealing bars 40, heat sealing bars 42 seal to the bases 20 of the fastener profile strips those areas of the film 13 which engage the bases. Also, in the turning of the film 13 on itself, the index marks 27 of the film are brought into registration with the index marks 28, or the notches 29 of the fastener strip base, as the case may be. As the film tube, enclosed product masses and fastener assembly advance from the station 11, the fin 39 may be turned over and flattened as by means of a roller 43.

Upon advancing into the cross sealing and package separation station 12, the generally tubular fastener assembly equipped packaging assembly is cross sealed by means of heat sealing bars 44 in alignment with the spaces between the product masses 15 and the spot seals 21. This produces product enclosing packages 45 which are then successively separated from one another along the heat seal seams formed by the bars 44.

In addition to their cross sealing function, the bars 44 may be adapted to function as means for advancing the packaging assembly by package increments. This may be effected by having the bars 44 mounted not only for relative closing and opening for their cross sealing function, but also for joint reciprocation in a back and forth manner as indicated by directional arrows.

As a further control in the operation of the form, fill and seal machine, and in particular for thorough coordination of all phases of the indexing arrangement, a sensor 47 connected to the control 42 may be provided at the cross sealing station 12 for observing the matched indexing marks 27, 28, or 28, 29, as the case may be, on arrival of each set of matched index marks in the cross sealing station.

Instead of the fold 41 being formed in a generally horizontal manner as depicted in FIGS. 1 and 2, the fold 41 may be formed in a generally vertical manner, as exemplified in FIG. 8, by maneuvering the film 13 through a fold shaping device 48. As the fold 41 is formed by the device 48, the fastener strip assembly 17 is fed into the fold, as shown. In this arrangement, the heat sealing bars 42, instead of being located generally in transverse alignment with the fin sealing bars 40, may be located in advance of the fin sealing bars, for sealing the fastener strip assembly within the fold 41.

It will be understood that variations and modifications may be effected without departing from the spirit and scope of the novel concepts of this invention.

I claim as my invention:

1. A method of packaging product masses in a form, fill and seal machine, comprising:

running a continuous length of packaging film in the following order through a succession of work stations in the machine, including a loading station wherein product masses are successively placed into engagement with the film at substantially uniformly spaced intervals, a product mass enclosing and film sealing station wherein the film is wrapped and sealed into a tube about the product, and a cross sealing and package separation station wherein the film tube is cross sealed in the spaces between the successive product masses to seal the product masses within individual packages;

adjacent to said loading station joining in co-running relation with the packaging film, a continuous length of separately formed plastic reclosable fastener assembly having interlocked profile strips spot sealed together at package length intervals;

effecting said joining near one side of said product masses, and orienting the co-running fastener strip assembly and the packaging film so that the spot seals of the strip are located in alignment with the spaces between the product masses on the film;

adjacent to said enclosing and sealing station securing the fastener assembly permanently within a fold of said film so that a package length section of the fastener strip assembly will be present in each individual product package; and at the cross sealing station cross sealing the fastener strip assembly spot seals with the cross sealing of the film tube.

2. A method according to claim 1, wherein said orienting includes indexibly determining the position of said spot seals relative to said spaces between the product masses on the film.

3. A method according to claim 2, wherein said indexibly determining is effected by sighting indexing spot means on respectively said film and said fastener assembly.

4. A method according to claim 2, which comprises sensing longitudinally spaced indexing spots on said film and longitudinally spaced notches in said fastener assembly.

5. A method according to claim 1, wherein said orienting includes avoiding misalignment of said spot seals relative to the spaces between the product masses by operating a sensor and adjusting system in relation to cooperating indexing means on said film and said fastener assembly.

6. A method according to claim 1, wherein said orienting includes indexing said film and said fastener assembly at said loading station, and at said cross sealing and package separation station.

7. A method according to claim 1, which comprises enclosing the fastener strip assembly within a fold of the film, and within the fold matching indexing means on said film with indexing means on said fastener strip assembly.

8. A method according to claim 1, wherein said film and said fastener assembly comprise compatible heat sealable extruded plastic material, heat sealing a fin of the film over the product masses, and effecting said securing of the fastener assembly to the film by concurrently heat sealing the fastener assembly to the film.

9. A method according to claim 1, which comprises forming a longitudinal fold in the film, and guiding the fastener assembly into assembled relation with the film within said fold.

10. Apparatus for packaging product masses in a form, fill and seal machine, comprising:

means for running a continuous length of packaging film in the following order through a succession of work stations in the machine, including a loading station wherein product masses are successively placed into engagement with the film at substantially uniformly spaced intervals, a product mass enclosing and film sealing station having means for wrapping and sealing the film into a tube about the product, and a cross sealing and package separation station having means for cross sealing the film tube in the spaces between the successive product masses to seal the product masses within individual packages;

means adjacent to said loading station for joining in corunning relation with the packaging film a continuous length of separately formed plastic reclosable fastener assembly having interlocked profile strips spot sealed together at package length intervals;

means for effecting said joining near one side of said product masses and for orienting the corunning fastener strip assembly and the packaging film so that the spot seals of the strip are located in alignment with the spaces between the product masses on the film;

means adjacent to said enclosing and sealing station for securing the fastener assembly to the film permanently within a fold of said film so that a package length section of the fastener strip assembly will be present in each individual package; and said cross sealing means at said cross sealing station operating for cross sealing the fastener strip assembly spot seals with cross sealing of the film tube.

11. Apparatus according to claim 10, wherein said orienting means includes means for indexing said spot seals relative to said spaces between the product masses on the film.

12. Apparatus according to claim 11, wherein said indexing means includes means for sighting indexing spot means on respectively said film and said fastener assembly.

13. Apparatus according to claim 11, wherein said indexing means senses longitudinally spaced indexing spots on said film and longitudinally spaced notches in said fastener assembly.

14. Apparatus according to claim 10, wherein said orienting means includes a sensor system operating in relation to indexing means on said film and on said fastener assembly for avoiding misalignment of said spot seals relative to the spaces between the product masses.

15. Apparatus according to claim 10, including means for sealing a fin of the film over the product masses, and said securing means operating to heat seal the fastener assembly to the film concurrently with operation of said fin sealing means.

16. Apparatus according to claim 10, including means for supporting the film spread out, means for forming a longitudinal fold in the spread out film, and means for guiding the fastener assembly into assembled relation with the film within said fold.

17. Apparatus according to claim 10, wherein said orienting means includes means for indexing said film and said fastener assembly at said loading station and at said cross sealing and package separation station.

18. Apparatus according to claim 10, which comprises means for enclosing the fastener strip assembly within a fold of the film, and for matching index mark means on said film with index mark means on said fastener strip assembly within the fold.

19. Apparatus according to claim 10, including means for forming a longitudinal fold in the film, and means for guiding the fastener assembly into assembled relation with the film within said fold.

20. A method of packaging product masses in a form, fill and seal machine, comprising:

running a continuous length of packaging film in the following order through a succession of work stations in the machine, including a loading station wherein product masses are successively placed at substantially uniformly spaced intervals on the film supported in a spread out condition, a product mass enclosing and film sealing station wherein the film is wrapped and sealed into a tube about the product, and a cross sealing and package separation station wherein the film tube is cross sealed in the spaces between the successive product masses to seal the product masses within individual packages;

adjacent to said loading station supporting the film in spread out condition;

forming a longitudinal fold in the spread out film near one side of said product masses; guiding into assembled relation with the film within said fold a continuous co-running length of separately formed plastic recloseable fastener assembly having interlocked profile strips spot sealed together at package length intervals; and orienting the co-running fastener strip assembly and the packaging film so that the spot seals of the strip are located in alignment with the spaces between the product masses on the film;

adjacent to said enclosing and sealing station securing the fastener assembly permanently within said fold so that a package length section of the fastener strip assembly will be present in each individual product package; and at the cross sealing station cross sealing the fastener strip assembly spot seals with the cross sealing of the film tube.

* * * * *